United States Patent [19]

Tudor

[11] Patent Number: 5,558,160
[45] Date of Patent: Sep. 24, 1996

[54] NITROGEN/CARBON DIOXIDE COMBINATION FRACTURE TREATMENT

[75] Inventor: Robin Tudor, High River, Canada

[73] Assignee: Canadian Fracmaster Ltd., Canada

[21] Appl. No.: 372,354

[22] Filed: Jan. 13, 1995

[30] Foreign Application Priority Data

Nov. 14, 1994 [CA] Canada ................... 2135719

[51] Int. Cl.$^6$ .............................................. E21B 43/267
[52] U.S. Cl. .................... 166/280; 166/177.5; 166/302; 166/308
[58] Field of Search .................. 166/177, 280, 166/302, 308, 177.5

[56] References Cited

U.S. PATENT DOCUMENTS

| | | | |
|---|---|---|---|
| 4,374,545 | 2/1983 | Bullen et al. | 166/280 |
| 4,436,156 | 3/1984 | Fredrickson | 166/308 X |
| 4,534,413 | 8/1985 | Jaworowsky | 166/302 |
| 4,627,495 | 12/1986 | Harris et al. | 166/280 |
| 4,701,270 | 10/1987 | Bullen et al. | 166/308 X |
| 5,069,283 | 12/1991 | Mack | 166/308 |
| 5,424,285 | 6/1995 | Stacy et al. | 507/202 |

FOREIGN PATENT DOCUMENTS

| | | |
|---|---|---|
| 687938 | 6/1964 | Canada . |
| 745453 | 11/1966 | Canada . |
| 932655 | 8/1973 | Canada . |
| 1034363 | 11/1976 | Canada . |
| 1043091 | 11/1978 | Canada . |
| 1134258 | 10/1982 | Canada . |
| 1197977 | 12/1985 | Canada . |
| 1241826 | 9/1988 | Canada . |
| 1242389 | 9/1988 | Canada . |

OTHER PUBLICATIONS

"Gas Frac—A New Stimulation Technique Using Liquid Gases," R. E. Hurst, Society of Petroleum Engineers of AIME, No. SPE 3837 (1972).

Primary Examiner—George A. Suchfield
Attorney, Agent, or Firm—Lerner, David, Littenberg, Krumholz & Mentlik

[57] ABSTRACT

There is provided an apparatus and a method of fracturing an underground formation penetrated by a well bore comprising the steps of forming a first pressurized stream of liquified gas, introducing proppants into the first stream for transport of the proppants in the first stream, pressurizing and cooling the proppants to substantially the storage pressure and temperature of the liquified gas prior to introducing the proppants into the first stream, forming a second pressurized stream of gas and admixing the first and second streams to form a fracturing fluid for injection into the formation at a rate and pressure to cause the fracturing thereof.

32 Claims, 4 Drawing Sheets

EQUIPMENT SETUP FOR GAS/CO$_2$ FRACTURE

EQUIPMENT SETUP FOR GAS/CO₂ FRACTURE

FIG. 6

NITROGEN/CARBON DIOXIDE COMBINATION FRACTURE TREATMENT

FIELD OF THE INVENTION

This invention relates to the art of hydraulically fracturing subterranean earth formations surrounding oil wells, gas wells and similar bore holes. In particular, this invention relates to hydraulic fracturing utilizing low temperature-low viscosity fracture fluids and the co-mingling of a gas or gases with liquid carbon dioxide as a medium to fracture subterranean formations.

BACKGROUND OF THE INVENTION

Hydraulic fracturing has been widely used for stimulating the production of crude oil and natural gas from wells completed in reservoirs of low permeability. Methods employed normally require the injection of a fracturing fluid containing suspended propping agents into a well at a rate sufficient to open a fracture in the exposed formation. Continued pumping of fluid into the well at a high rate extends the fracture and leads to the build up of a bed of propping agent particles between the fracture walls. These particles prevent complete closure of the fracture as the fluid subsequently leaks off into the adjacent formations and results in a permeable channel extending from the well bore into the formations. The conductivity of this channel depends upon the fracture dimensions, the size of the propping agent particles, the particle spacing and the confining pressures.

The fluids used in hydraulic fracturing operations must have fluid loss values sufficiently low to permit build up and maintenance of the required pressures at reasonable injection rates. This normally requires that such fluids either have adequate viscosities or other fluid loss control properties which will reduce leak-off from the fracture into the pores of the formation.

Fracturing of low permeability reservoirs has always presented the problem of fluid compatibility with the formation core and formation fluids, particularly in gas wells. For example, many formations contain clays which swell when contacted by aqueous fluids causing restricted permeability, and it is not uncommon to see reduced flow through gas well cores tested with various oils.

Another problem encountered in fracturing operations is the difficulty of total recovery of the fracturing fluid. Fluids left in the reservoir rock as immobile residual fluids impede the flow of reservoir gas or fluids to the extent that the benefit of fracturing is decreased or eliminated. Attempting the removal of the fracturing fluid may require a large amount of energy and time, sometimes not completely recovering all the products due to formation characteristics. Consequently the reduction or elimination of the problem of fluid recovery and residue removal is highly desired.

In attempting to overcome fluid loss problems, gelled fluids prepared with water, diesel, methyl alcohol, solvents and similar low viscosity liquids have been useful. Such fluids have apparent viscosities high enough to support the proppant materials without settling and also high enough to prevent excessive leak-off during injection. The gelling agents also promote laminar flow under conditions where turbulent flow would otherwise take place and hence in some cases, the pressure losses due to fluid friction may be lower than those obtained with low viscosity-base fluids containing no additives. Certain water-soluble, poly-acrylamides, oil soluble poly-isobutylene and other polymers which have little effect on viscosity when used in low concentration can be added to the ungelled fluid to achieve good friction reduction.

In attempting to overcome the problem of fluid compatibility when aqueous fracturing fluids are used, chemical additives have been used such as salt or chemicals for pH control. Salts such as NaCl, KCl or $CaCl_2$ have been widely used in aqueous systems to reduce potential damage when fracturing water sensitive formations. Where hydrocarbons are used, light products such as gelled condensate have seen a wide degree of success, but are restricted in use due to the nature of certain low permeability reservoirs.

Low density gases such as $CO_2$ or $N_2$ have been used in attempting to overcome the problem of removing the fracturing (load) liquid. The low density gases are added to the load fluid at a calculated ratio which promotes back flow subsequent to fracturing. This back flow of load fluids is usually due to reservoir pressure alone without mechanical aid from the surface because of the reduction of hydrostatic head caused by gasifying the fluid.

Moreover, low density liquified gases have themselves been used a fracturing fluids. Reference is made to Canadian Patents 687,938 and 745,453 to Peterson who discloses a method and apparatus for fracturing underground earth formations using liquid $CO_2$. Peterson recognized the advantages of liquid $CO_2$ as a means to avoid time consuming and expensive procedures involved in the recovery of more conventional fracturing fluids. Peterson however does not disclose the use of entrained proppants in conjunction with liquid $CO_2$. The combination of a liquid $CO_2$ fracturing fluid and propping agents has been described by Bullen in Canadian Patent 932,655 wherein there is described a method of entraining proppants in a gelled fluid, typically a gelled methanol, which is mixed with liquid carbon dioxide and injected into low permeability formations. The liquid carbon dioxide is allowed to volatize and bleed off and the residual liquid, primarily methyl alcohol, is in part dissolved by formation hydrocarbons and allowed to return to the surface as vapor, the balance, however, being recovered as a liquid using known recovery techniques. It has however been demonstrated that the need to use a gelled carrier fluid has resulted in the negation of some of the fluid recovery advantages attendant upon the sole use of liquified gas fracturing fluids.

Subsequent disclosures have been concerned primarily with the development of more advantageous gelled fluids to entrain proppants for subsequent or simultaneous blending with the liquified carbon dioxide fracturing fluid. Reference is made to Canadian Patents 1,000,483 (reissued as Canadian Patent 1,034,363), 1,043,091, 1,197,977, 1,241,826 and 1,242,389 in this regard. Each of these patents teaches the nature and composition of gelled or ungelled carrier fluids, typically methanol or water based, which, when blended with liquid $CO_2$, produce a two-phase liquid system which allegedly is useful in attempting to overcome the problems of leak-off and fluid compatibility with formation fluids while at the same time being capable of transporting increased concentrations of proppant material into the fracture zones.

Treatments have also been designed utilizing combinations of fluids with nitrogen or carbon dioxide and even binary foams where nitrogen and liquid carbon dioxide are combined into an aqueous or water-based fracturing fluid. Reference is made in this regard to U.S. Pat. No. 5,069,283 issued on Dec. 3, 1991 to the Western Company of North America. The addition of nitrogen and/or liquid carbon dioxide provides a non-combustible gas that aids in the recovery of the treatment fluids. These gasified fluids also reduce the amount of potentially damaging aqueous fluid pumped into the formation. Despite this, this method nevertheless requires the incorporation of a thickening agent into the aqueous fluid to provide sufficient viscosity to entrain adequate proppants and to prevent leak-off. Although these gasified fluids reduce the amount of potentially damaging gelled and/or cross-linked load fluid pumped into the formation, the risk of contamination by significant residual liquid fractions remains high.

From the foregoing, it will be readily appreciated that the use of liquid $CO_2$ as a fracturing agent is known. It is further known to use other liquids having propping agents entrained therein for blending with the liquified gas fracturing fluid. The propping agents are subsequently deposited in the liquid or foam-formed fractures for the purpose of maintaining flow passages upon rebound of the fracture zone. It is further known that proppant materials can be introduced into a liquid carbon dioxide system if a chemically gelled or cross-linked liquid, usually alcohol or water-based, is mixed with the $CO_2$ to impart sufficient viscosity to the mixture to support proppant particles and to control leak-off in the fracture. So-called "binary" systems incorporating additional quantities of nitrogen in a thickened aqueous substrate are known. All of these practices lead to residual chemicals and gel precipitates left in the fracture proppant pack that can impair production of the well.

In Canadian Patent 1,134,258 belonging to the assignee herein, it has been recognized that proppant materials can be introduced directly into a liquid carbon dioxide stream using little or no other viscosifying liquid components while still transporting significant quantities of up to 800 kg/m$^3$ (and more in some situations) of proppant material into the fracture zones. This has been achieved by pressurizing and cooling the proppants to substantially the storage pressure and temperature of the liquified $CO_2$ prior to blending of the two for injection down the well bore.

This method, based as it is on the injection of pure or virtually pure $CO_2$, enjoys the obvious advantage of lessening the impact of the treatment fluid on the formation. A gas as mentioned in this application describes any substance that at atmospheric conditions exists in the vapour phase of that substance. Liquid $CO_2$, and gases such as nitrogen, air, exhaust gas, natural gas and insert gases, are all relatively inert to the formation being stimulated and therefore no damage is done to the formation due to injection since it is believed that $CO_2$ and the other aforementioned gases do not change the relative permeability of the reservoir rock. The liquid $CO_2$ fracturing medium converts to a gaseous state after being subjected to formation temperatures and pressures to eliminate associated fluid pore blockage in the formation and to promote complete fluid recovery on flow back. Moreover, no residual chemicals or gel precipitates are left behind to impair fracture conductivity.

There have been literally hundreds of fracture treatments in Canada and abroad using 100% liquid $CO_2$. There have also been treatments using 100% gaseous nitrogen. A medium consisting solely of liquified $CO_2$ and nitrogen has not been used. Reasons include: dilution of the liquified $CO_2$ using nitrogen will obviously even further reduce what little inherent proppant carrying capacity is possessed by the $CO_2$, increase of fluid losses into the formation, and increased surface pumping pressures from increased friction pressures and decreased hydrostatic head caused by the addition of nitrogen that will increase costs.

Applicant has discovered however that significant advantages can be obtained from the co-mingling of gases with liquid $CO_2$ and, when combined with the method of Canadian Patent 1,134,258, without loss of proppant carrying capacity. Moreover, contrary to expectations, liquid $CO_2/N_2$ treatments result in actual lowering of surface treatment pressures at equivalent volumetric rates which reduces pumping costs, and yield improved leak-oil characteristics. Significant additional economic benefits accrue as well as will be discussed below.

SUMMARY OF THE INVENTION

Accordingly, it is an object of the present invention to provide a fracturing fluid and a method of hydraulic fracturing utilizing a liquified gas co-mingled with a gas providing both commercially acceptable proppant deliveries with minimum formation contamination.

In a preferred aspect of the present invention, these objects are achieved by adding gaseous nitrogen to a stream of liquified carbon dioxide including proppants entrained therein.

According to the present invention, then, there is provided a method of fracturing an underground formation penetrated by a well bore comprising the steps of forming a first pressurized stream of liquified gas, introducing proppants into said first stream for transport of said proppants in said first stream, pressurizing and cooling said proppants to substantially the storage pressure and temperature of said liquified gas prior to introducing said proppants into said first stream, forming a second pressurized stream of gas, and admixing said first and second streams to form a fracturing fluid for injection into said formation at a rate and pressure to cause the fracturing thereof.

According to yet another aspect of the present invention, there is also provided a method of propping open a hydraulically fractured underground formation penetrated by a well bore comprising the steps of introducing propping agents into a first stream of pressurized liquified gas, said propping agents having been previously pressurized and cooled to the pressure and temperature of said liquified gas, respectively, admixing said first stream with a second stream of pressurized gas to form a fracturing fluid, and pumping said fluid into said formation at a rate and pressure sufficient to deposit said proppants in fractures formed in said formation.

According to yet another aspect of the present invention, there is also provided a method of fracturing an underground formation penetrated by a well bore comprising the steps of adding proppants to a first stream of liquified gas, said proppants being pressurized and cooled to substantially the pressure and temperature of said liquified gas prior to the addition thereof to said first stream, pressurizing said first stream for injection into said formation, pressurizing a second stream of gas for injection into said formation, and mixing said first and second streams to form a fracturing fluid prior to injection thereof into said formation at a rate and pressure sufficient to cause the fracturing thereof.

According to yet another aspect of the present invention, there is also provided apparatus for hydraulically fracturing an underground formation penetrated by a well bore comprising high pressure pump means for injecting a first stream of liquified gas down said well bore, first storage means to store said liquified gas under pressure, conduit means to provide fluid communication between said pump means and said first storage means, second storage means to store proppants at a temperature and pressure substantially equal to the storage pressure and temperature of said liquified gas blender means to blend said proppants from said second storage means into said first stream prior to injection thereof down said well bore, second high pressure pump means for injecting a second stream of gas down said well bore, third storage means to store said gas, and high pressure supply lines to provide fluid communication between said first and second pump means and said well bore, said supply lines from said first and second pump means intersecting one another prior to said well bore for admixing of said first and second streams flowing therein before injection thereof down said well bore.

According to yet another aspect of the present invention, there is also provided a method of fracturing an underground formation penetrated by a well bore comprising the steps of forming a first pressurized stream of liquified gas, forming a second pressurized stream of gas, and admixing said first and second streams to form a fracturing fluid for injection into said formation at a rate and pressure to cause the fracturing thereof.

According to yet another aspect of the present invention, there is also provided a method of fracturing an underground formation penetrated by a well bore comprising the steps of co-mingling a liquified gas and a non-liquified gas to form a fracturing fluid, and injecting said fracturing fluid into said formation to induce the formation of fractures therein.

According to yet another aspect of the present invention, there is also provided a fluid for fracturing an underground formation penetrated by a well bore comprising a mixture of a liquified gas and a gas.

BRIEF DESCRIPTION OF THE DRAWINGS

Embodiments of the invention will now be described in greater detail and will be better understood when read in conjunction with the following drawings, in which.

DETAILED DESCRIPTION

It will be appreciated by those skilled in the art that a number of different liquified gases having suitable viscosities and critical temperatures may be utilized as fracturing fluids. For purposes of illustration, however, and having regard to the cost and safety advantages afforded by the use of carbon dioxide, reference will be made herein to the use of liquified carbon dioxide as the principal liquified gas fracturing agent of the present hydraulic fracturing method.

As the basic method of combining proppant material with liquid $CO_2$ referred to in Canadian Patent 1,134,258 is a component of the present invention, it will be useful to redescribe that process in considerable detail herein as follows. It will be understood that the following description is intended to be exemplary in nature and is not limitative of the present invention. Other means of combining liquid $CO_2$ with proppants may occur to those skilled in the art as will alternative apparati.

Figure 1:
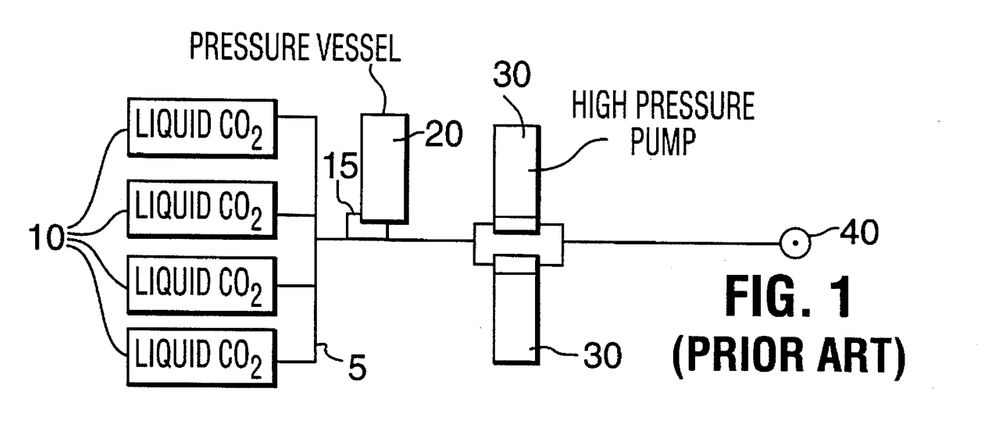
FIG. 1 is a block diagram of the hydraulic fracturing system combining proppants with liquid $CO_2$.
Figure 2:
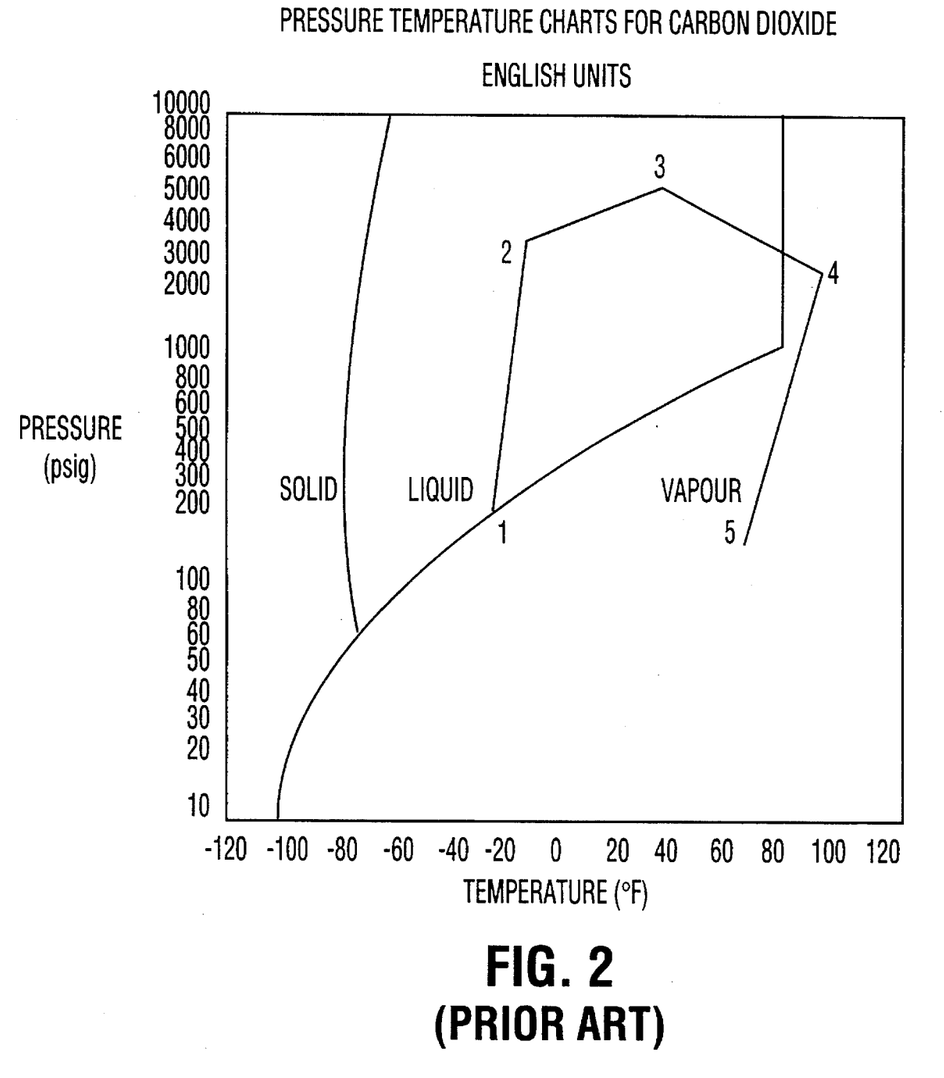
FIG. 2 is a pressure-temperature plot for $CO_2$ in the region of interest with respect to the method of well fracturing illustrated in FIG. 1.

Referring to FIGS. 1 and 2 together, liquified $CO_2$ and proppants are transported to a well site. At the site, the liquified $CO_2$ is initially maintained at an equilibrium temperature and pressure of approximately −31° C. and at 1,380 kPa (#1 in FIG. 2) in a suitable storage vessel or vessels 10 which may include the transport vehicle(s) used to deliver the liquified gas to the site. The proppants are also stored in a pressure vessel 20. The proppants are pressurized and cooled using some liquid $CO_2$ from vessels 10 introduced into vessel 20 via manifold or conduit 5 and tank pressure line 15. In this manner, the proppants are cooled to a temperature of approximately −31° C. and subjected to a pressure of approximately 1,380 kPa.

Liquid $CO_2$ vaporized by the proppant cooling process is vented off and a ½ to ¾ capacity (FIG. 3) level 24 of liquid $CO_2$ is constantly maintained in vessel 20 so as to prevent the passage of vapor downstream to the high pressure pumps 30 used to inject the fracture fluids into the well bore 40. Pumps 30 are of conventional or known design so that further details thereof have been omitted from the present description.

Prior to the commencement of the fracturing process, the liquid $CO_2$ stored in vessels 10 is pressured up to approximately 2,070 to 2,410 kPa, that is, about 690 to 1,035 kPa above equilibrium pressure, so that any pressure drops or temperature increases in the manifolds or conduits between vessels 10 and pumps 30 will not result in the release of vapor but will be compensated for to ensure delivery of $CO_2$ liquid to frac pumps 30. Methods of pressuring up the liquid $CO_2$ are well known and need not be described further here.

Liquified $CO_2$ is delivered to pumps 30 from vessels 10 along a suitable manifold or conduit 5. Pumps 30 pressurize the liquified $CO_2$ to approximately 17,250 to 68,950 kPa or higher, the well-head injection pressure. The temperature of the liquid $CO_2$ increases slightly as a result of this pressurization.

The horizon to be fractured is isolated and the well casing adjacent the target horizon is perforated in any known fashion. The liquid $CO_2$ is pumped down the well bore 40, through the perforations formed into the casing and into the formation. With reference to FIG. 2, the temperature of the $CO_2$ increases as it travels down the well bore due to the absorption of heat from surrounding formations. It will therefore be appreciated that the $CO_2$ must be pumped at a sufficient rate to avoid prolonged exposure of the $CO_2$ in the well bore to formation heat sufficient to elevate the temperature of the $CO_2$ beyond its critical temperature of approximately 31° C.

Methods of calculating rates of heat adsorption and appropriate flow rates are well known and therefore will not be elaborated upon here. It will in any event be appreciated that with continued injection, the temperature of surrounding pipes and formations are reduced to thereby minimize vapor losses during injection.

Pressurization of the $CO_2$ reaches a peak (3) at the casing perforations and declines gradually as the $CO_2$ moves laterally into the surrounding formations. Fracturing is accomplished of course by the high pressure injection of liquified $CO_2$ into the formations. After pumping is terminated the pressure of the carbon dioxide bleeds off to the initial pressure of the formation and its temperature rises to the approximate initial temperature of the formation.

During the fracturing process, of course, the liquified carbon dioxide continues to absorb heat until its critical temperature (31° C.) is reached whereupon the carbon dioxide volatilizes. Volatilization is accompanied by a rapid increase in $CO_2$ volume which may result in increased fracturing activity. The gaseous $CO_2$ subsequently leaks off or is absorbed into surrounding formations. When the well is subsequently opened on flow back, the carbon dioxide exhausts itself uphole due to the resulting negative pressure gradient between the formation and the well bore.

As mentioned above, the propping agents are cooled to the approximate temperature of the liquified $CO_2$ prior to introduction of the proppants into the $CO_2$ stream. The heat absorbed from the proppants would otherwise vaporize a percentage of the liquid $CO_2$, eliminating its ability to adequately support the proppants at typical pumping rates and which could create efficiency problems in the high pressure pumpers. The specific heat of silica sand proppant is approximately 0.84 kj/kg K. The heat of vaporization of $CO_2$ at 1,725 kPa is approximately 232.6 kj/kg. To cool silica sand proppant from a 21.1° C. transport temperature to the liquid $CO_2$ temperatures of $-31.7°$ C. will therefore require the vaporization of approximately 0.09 kg of $CO_2$ for each 0.454 kg of sand so cooled.

Figure 3:
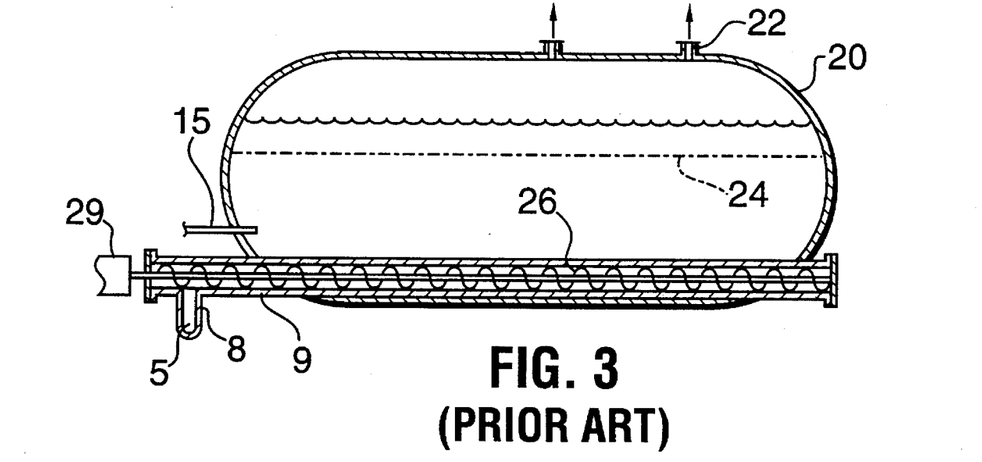
FIG. 3 is a sectional view taken along the longitudinal axis of the proppant tank illustrated schematically in FIG. 1.
Figure 4:
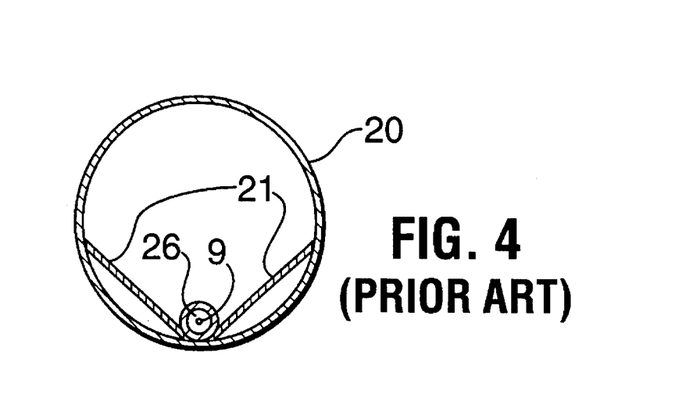
FIG. 4 is a partially sectional view of the proppant tank of FIG. 3.
Figure 5:
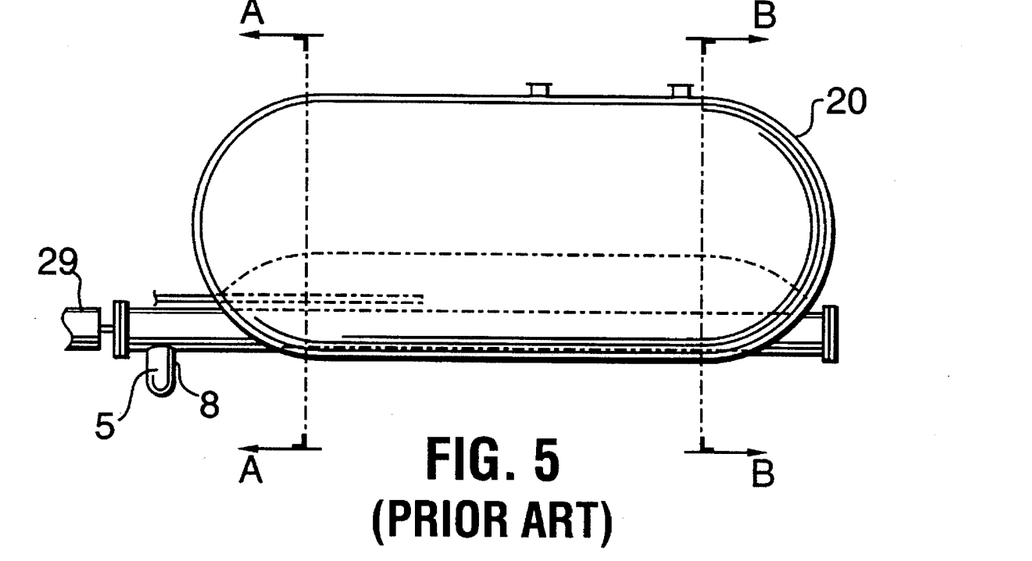
FIGS. 5, 5a and 5b are more detailed views of the tank of FIGS. 3 and 4.
Figure 5A:
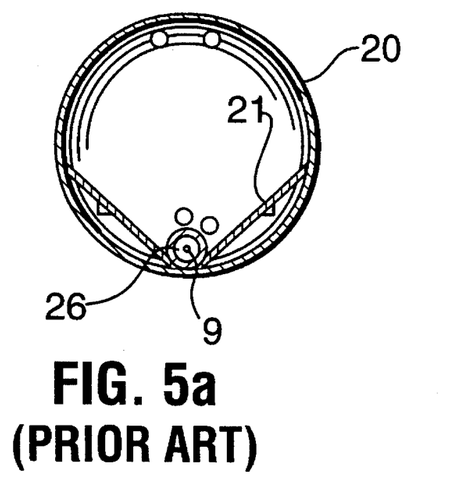
Figure 5B:
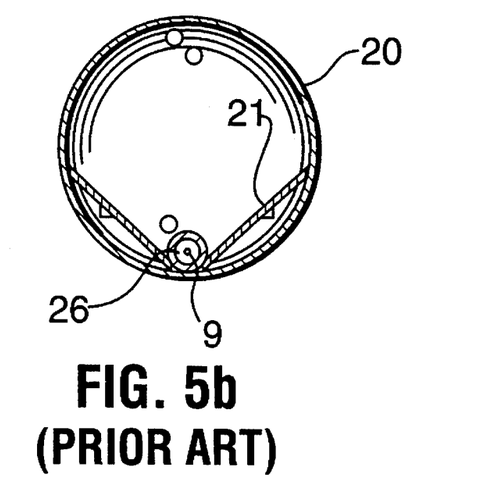

Reference is now made to FIGS. 3 and 4 which illustrates proppant pressure vessel and blender (tank) 20 in greater detail. The liquid carbon dioxide used to pressurize and cool the enclosed proppants is introduced into tank 20 via pressure line 15 and the excess vapors generated by the cooling process are allowed to escape through vent 22. Liquid $CO_2$ operating level 24 prevents an excess accumulation of vapors and further isolates the vapors from the proppants transported along the bottom of tank 20 towards the liquid $CO_2$ stream passing through conduit 5.

Tank 20 may be fitted with baffle plates 21 to direct the proppants toward a helically wound auger 26 passing along the bottom of tank 20 in a direction towards conduit 5 via an auger tube 9. Auger drive means 29 of any suitable type are utilized to rotate auger 26. Auger tube 9 opens downwardly into a chute 8 communicating with conduit 5 so that proppants entrained along the auger are introduced into the $Co_2$ stream passing through the conduit. It will be appreciated that the pressure maintained in tube 9 equals or exceeds that in conduit 5 to prevent any blow back of the liquid $CO_2$.

It will be appreciated that tank 20 may be of any suitable shape and feed mechanisms other than the one illustrated utilizing auger 26 may be employed, a number of which, including gravity feed mechanisms, will occur to those skilled in the art.

After sufficient liquified carbon dioxide has been injected into the well to create a fracture in the target formation, cooled proppants from pressurized proppant tank 20 may be introduced into the streams of liquid carbon dioxide to be carried into the fracture by the carbon dioxide. The proppants may include silica sand of 40/60, 20/40 and 10/20 mesh size. Other sizes and the use of other materials is contemplated depending upon the requirements of the job at hand.

It will be appreciated that if so desired, cooled proppants may be introduced into the carbon dioxide stream simultaneously with the initial introduction of the liquified carbon dioxide into the formation for fracturing purposes.

Upon completion of fracturing, the well may be shut in to allow for complete vaporization of the carbon dioxide and to allow formation rebound about the proppants. The well is then opened on flow back and $CO_2$ gas is allowed to flow back and exhaust to the surface.

Figure 6:
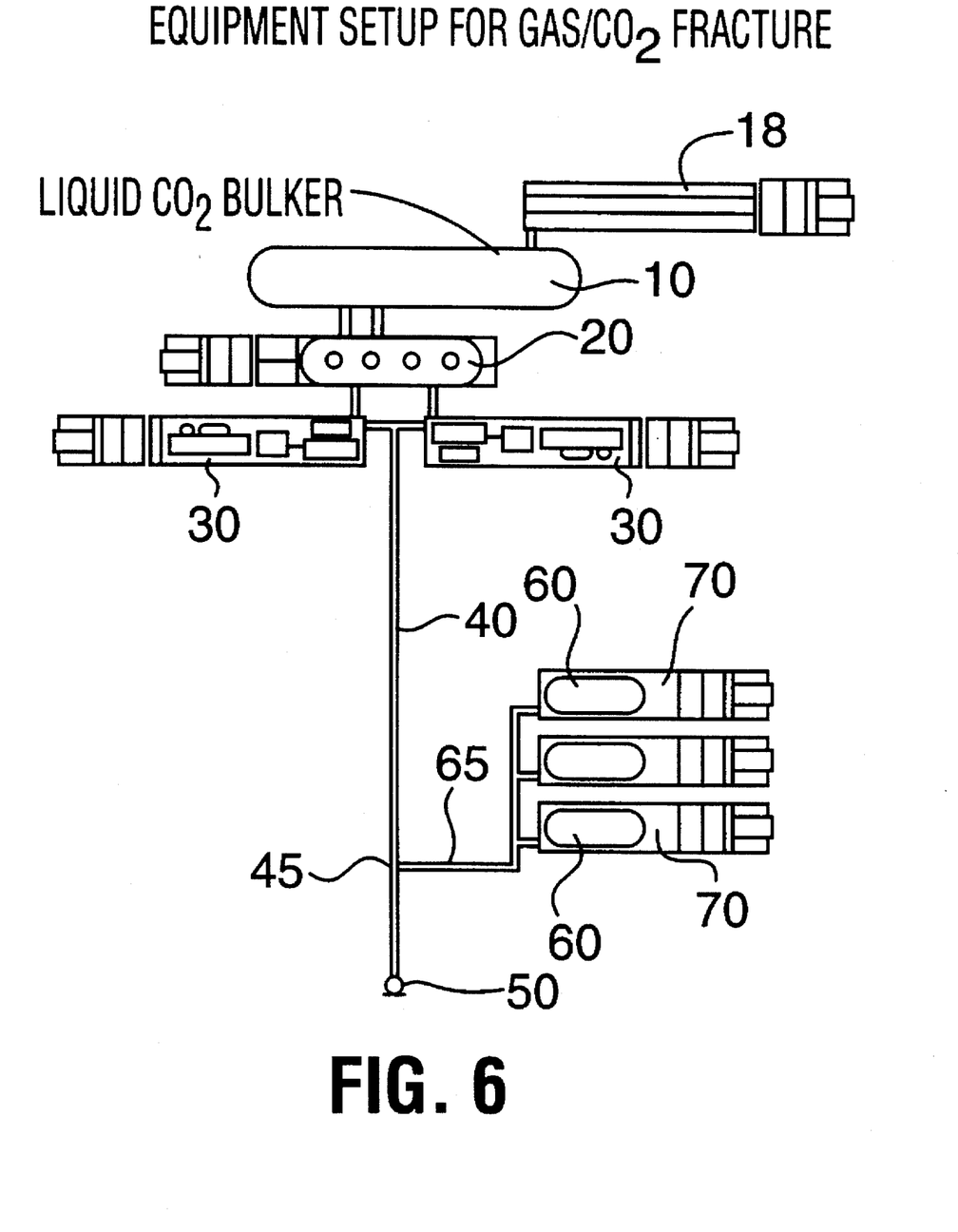
FIG. 6 is a block diagram of the hydraulic fracturing system of the present invention.

Turning more specifically now to the present invention, the methodology involved is similar in outline to that described above with reference to Canadian Patent 1,134,258, including transport to the site of liquid $CO_2$, proppants, gaseous nitrogen storage vessels for the same and of course high pressure fracture pumpers. A typical well site equipment layout is illustrated in FIG. 6. The layout includes a $CO_2$ supply side comprising one or more storage vessels or bulkers 10 for liquid $CO_2$, a pressure vessel 20 for pressurized storage and blending of the proppants with $CO_2$ from vessels 10 and high pressure fracture pumpers 30 for pumping the $CO_2$/proppant mixture through high pressure supply line 40 to the well head 50 and down the well bore. The layout can additionally include a nitrogen booster 18 for bulker 10 and $CO_2$ pressure vessel 20.

The nitrogen supply side includes storage vessels 60 for the gas, and high pressure gas pumpers 70 which pump the gas through supply line 65 to the intersection 45 with supply line 40.

The intersection 45 in the supply line 40 is the point of initial contact between the streams of $CO_2$ and $N_2$ resulting in turbulence to form the liquid $CO_2$/gas mixture, additional admixing occurring along the remaining length of supply line 40 and down the well bore.

As will be apparent, the addition of the gas to the liquid $CO_2$ stream occurs downstream, in high pressure line 40, from blender 20 and high pressure pumps 30. Blender 20 adds proppant to the liquid $CO_2$ volumetrically at a predetermined maximum rate. This implies that the effective concentration of proppant is inversely proportional to the liquid $CO_2$ rate. Moreover, although the proppant stream is diluted by the addition of gas downstream of pumpers 30, higher proppant concentrations can be pumped in the slower liquid $CO_2$ stream making effective proppant concentrations approximately equal to standard liquid $CO_2$ treatments which lack co-mingling of gas.

The optimum ratio of gas to liquid $CO_2$ is completely variable with perhaps the only limitation being, when the stream includes proppants, that there be sufficient $CO_2$ to transport the specified proppant quantities. Otherwise, the ratio may be chosen as a matter of convenience and economics having regard to one or more factors including depth and temperature of formation to be treated, distance to well site for transportation costs, relative cost and availability of gas/$CO_2$ products, treatment pressures, volumetric rates at which treatments will be performed, configuration of the well bore and the number of treatments to be performed per day. Initial treatments conducted by the applicant at 67%/33% $N_2$/$CO_2$ have reflected primarily convenience and cost of product.

The invention further illustrated by the following examples:

EXAMPLES

A gas well located in township 17 Range 20 West of the fourth meridian in Alberta, Canada was completed with 114.3 mm casing to a depth of 587 meters. The Belly River (gas) zone was perforated from 587 to 610 m. All completion fluid was removed from the well prior to commencement of treatment.

One liquid carbon dioxide ($CO_2$) bulker containing 55.0 $m_3$ of liquid $CO_2$ at approximately 2.0 MPa and $-20$ C was connected to two high pressure frac pumpers through a pressurized liquid $CO_2$ blender. The liquid $CO_2$ blender was loaded with approximately 5 tons of 20/40 mesh sand prior to being pressurized with liquid $CO_2$. Three industry conventional nitrogen pumpers containing approximately 4000 m³ of nitrogen gas (S.T.P.) each were connected in parallel with high pressure frac lines (pipe). The high pressure frac lines from the nitrogen pumpers joined the high pressure frac lines from the liquid CO₂ prior to the lines being connected to the wellhead. One way check valves were installed in the lines to ensure that one set of equipment would not overpower the other set.

Prior to the connection of the treatment lines to the wellhead a wire line company ran a combination pressure, temperature, gamma ray, and density tool to the bottom of the well to establish initial conditions. On completion of the wireline survey the treatment lines were connected to the wellhead. The pressurized liquid CO₂ blender, frac pumpers and lines were then cooled with liquid CO₂ vapour. All surface lines and pumpers were then pressure tested.

The treatment was initiated by using 6.3 m³ of liquid CO₂ to fill the well and then using 3.7 m³ of liquid CO₂ to create a fracture in the formation at a rate of 6.5–6.3 m³/minute and pressures of 13.7–10.8 MPa on surface and 12.0–11.0 MPa bottomhole. At this point pumping was stopped and both surface pressures and bottom hole pressures, temperatures and densities were monitored. The gathered data showed a fracture gradient of 9.8 kPa/m, a total friction gradient of 12.4 kPa/m which included approximately 700 kPa of perforation—near wellbore friction.

The treatment was reinitiated using 10 m³ of liquid Co₂ to recreate the fracture at a rate of 6.2–5.9 m³/minute and pressures of 11.2–10.3 Mpa surface and 11.0 Mpa bottomhole. Again the pumping was stopped and variables monitored. The gathered data showed a fracture gradient of 10.0 kPa/m, a total friction gradient of 10.7 kPa/m which included approximately 500 kPa of perforation—near wellbore friction.

A third mini frac was then pumped with liquid CO₂ at a rate of 2 m³/minute and nitrogen added at 480 m³/min (S.T.P.). The nitrogen rate was calculated based on bottomhole pressure and temperature to be 4.0 m³/minute volumetrically for a total volumetric rate of 6.0 m³/m. This part of the treatment was conducted at 8.0–8.5 MPa on surface and 10.6 MPa bottomhole pumping 4.6 m³ of liquid CO₂ and 1606 m³(S.T.P.) of nitrogen. The gathered data showed a fracture gradient of 10.5 kPa/m, a total friction gradient of 2.5 kPa/m which included approximately 50 kPa of perforation—near wellbore friction.

During the treatments the pressure required to move the liquid CO₂ from the bulkers was maintained by gaseous nitrogen supplied by a "Nitrogen Tube Trailer". The "Nitrogen Tube Trailer" is a series of pressure vessels that carries approximately 3500 m³ (S.T.P.) of gaseous nitrogen up to 18.0 MPa and can be regulated to supply any given constant pressure.

The wire line with the bottom hole recording devices was pulled to surface and disconnected from the wellhead prior to the commencement of the sand laden treatment.

The sand laden fracture treatment was then initiated with a pad consisting of 4.5 m³ liquid CO₂ pumped at 2.0 m³/minute and 1620 m³ (S.T.P.) N₂ pumped at 480 m³(S.T.P.)/minute. Surface treating pressures dropped from 9.1 MPa to 8.6 MPa during the pad. Sand addition was conducted at the liquid CO₂ blender as per the outlined Schedules I and II, pumping 5.0 tonnes of 20/40 mesh at concentrations of 300 kg/m³ to 1550 kg/m³ to the liquid CO₂ stream and calculated bottomhole effective concentrations of 100 kg/m³ to 500 kg/m³. The CO₂-sand slurry rate was increased during sand addition in order to maintain a constant N₂/CO₂ ratio of 2.0 and increase slurry velocities to aid in proppant movement at higher concentrations. The pressures during proppant addition were 8.8 MPa to 8.0 MPa.

| PROPPANT FLUID SCHEDULE I | | | | | |
|---|---|---|---|---|---|
| Stage | Cum Fluid (m³) | Fluid Stage (m³) | Sand Conc. (kg/m³) | Sand (kg/ Stage) | Cum Sand (kg) |
| Pad (Liquid CO2/N2) | 14.0 | 14.0 | | | |
| Start 20/40 Sand | 16.0 | 2.0 | 100 | 200 | 200 |
| Increase 20/40 Sand | 18.0 | 2.0 | 200 | 400 | 600 |
| Increase 20/40 Sand | 21.0 | 3.0 | 300 | 900 | 1,500 |
| Increase 20/40 Sand | 24.0 | 3.0 | 400 | 1,200 | 2,700 |
| Increase 20/40 Sand | 28.6 | 4.6 | 500 | 2,300 | 5,000 |
| Flush (Liquid CO2/N2) | 31.8 | 3.2 | | | |

| PROPPANT CO₂ SCHEDULE II | | | | | |
|---|---|---|---|---|---|
| Stage | Cum Fluid (m³) | Fluid Stage (m³) | Sand Conc. (kg/m³) | Sand (kg/ Stage) | Cum Sand (kg) |
| Pad (Liquid CO2) | 4.5 | 4.5 | | | |
| Start 20/40 Sand | 5.2 | 0.7 | 303 | 200 | 200 |
| Increase 20/40 Sand | 5.9 | 0.7 | 606 | 400 | 600 |
| Increase 20/40 Sand | 6.9 | 1.0 | 909 | 900 | 1,500 |
| Increase 20/40 Sand | 7.9 | 1.0 | 1212 | 1,200 | 2,700 |
| Increase 20/40 Sand | 9.4 | 1.5 | 1515 | 2,300 | 5,000 |
| Flush (Liquid CO2) | 10.5 | 1.1 | | | |

The slurry mixture was finally displaced to the perforations by pumping 1.1 m³ of liquid CO₂ at 2.0 m³/minute and 400 m³ (S.T.P.) gaseous nitrogen at 480 m³(S.T.P.)/minute. The pressures during the flush ranged from 7.9 MPa to 7.7 MPa. The gathered data showed a fracture gradient of 10.5 kPa/m, a total friction gradient of 1.5 kPa/m.

Additional treatments have been performed in the same area, all placing a minimum of 5 tonnes of 20/40 proppant in formation. The initial treatment was 100% liquid CO₂ and the following treatments were a 67%/33% mixture of n₂/CO₂. The 100% liquid CO₂ treatment placed 5 tonnes of proppant at concentrations of up to 500 kg/m³ in formation. The mixture treatments have placed up to 7 tonnes in formation at concentrations of up to 700 kg/m³.

Observed decreases in surface treatment pressures with the gas/CO₂ treatment are apparently due to the reduced coefficient of friction of the co-mingled fluid compared to pure liquified CO₂. The reasons for reduced leak-off into the formation being treated are not fully understood but could be due to the fact that the added gas requires less energy than the liquified gas to expand. This could generate more turbulent flow of the leaked-off fluid creating a near-fracture pressure zone that aids in leak-off control. Obviously, any drop in fluid loss rates increases the chances of successfully placing total specified proppants into the formation.

Applicant has found important economic advantages attendant to the method as described above. For the well owner, savings are realized due to the decreased amounts of liquid CO₂ required, nitrogen being considerably less expensive than liquid CO₂, and the complete or near complete elimination of chemical additives. Fewer CO₂ bulkers are required meaning lower transportation charges and the number of transports required to maintain the liquid CO₂ product is similarly reduced. Pumping charges are directly proportional to the liquid pumping rate and surface pumping pressures. As aforesaid, it has been discovered that co-mingling of gas with the liquid $CO_2$ results in a drop in the required liquid pumping rate and in surface treatment pressure, thereby adding substantially to the economic benefits as a result of reduced power requirements.

From the service company's perspective, the present method should expand the liquid $CO_2$ fracture market by supplying a less expensive method useful at shallow and greater depths. The improved logistics of the process due to reduced $CO_2$ transport ought to permit an increase in the maximum number of treatments per day which will additionally enhance savings and margins.

The above-described embodiments of the present invention are meant to be illustrative of preferred embodiments of the present invention and are not intended to limit the scope of the present invention. Various modifications, which would be readily apparent to one skilled in the art, are intended to be within the scope of the present invention. The only limitations to the scope of the present invention are set out in the following appended claims.

I claim:

1. A method of fracturing an underground formation penetrated by a well bore comprising the steps of:

forming a first pressurized stream of liquified gas;

introducing proppants into said first stream for transport of said proppants in said first stream;

pressurizing and cooling said proppants to substantially the storage pressure and temperature of said liquified gas prior to introducing said proppants into said first stream;

forming a second pressurized stream of gas; and admixing said first and second streams to form a fracturing fluid for injection into said formation at a rate and pressure to cause the fracturing thereof.

2. The method of claim 1 wherein said first and second streams are injected into said formation by means of high pressure pump means, said proppants being introduced into said first stream prior to pumping by said high pressure pump means.

3. The method of claim 1 wherein said proppants introduced into said first stream are cooled using said liquified gas.

4. The method of claim 3 wherein said proppant is present in said first stream in predetermined concentrations.

5. The method of claim 4 wherein said predetermined concentration of proppant in said first stream may be varied during fracturing of said underground formation.

6. The method of claim 5 wherein the ratio of said gas to said liquified gas by volume is substantially 2:1.

7. The method of claim 1 wherein said liquified gas is liquid carbon dioxide.

8. The method of claim 7 wherein said gas comprises one or more gases selected from the group consisting of nitrogen, air, exhaust gas, natural gas and inert gases.

9. The method of claim 8 wherein said fracturing fluid is injected into said well bore at a temperature below the critical temperature of said liquified gas.

10. The method of claim 9 wherein said concentration of said proppant in said first stream varies in the range from an amount in excess of 0 kg/m$^3$ to 1,550 kg/m$^3$.

11. A method of propping open a hydraulically fractured underground formation penetrated by a well bore comprising the steps of:

introducing propping agents into a first stream of pressurized liquified gas, said propping agents having been previously pressurized and cooled to the pressure and temperature of said liquified gas, respectively;

admixing said first stream with a second stream of pressurized gas to form a fracturing fluid; and pumping said fluid into said formation at a rate and pressure sufficient to deposit said proppants in fractures formed in said formation.

12. A method of fracturing an underground formation penetrated by a well bore comprising the steps of:

adding proppants to a first stream of liquified gas, said proppants being pressurized and cooled to substantially the pressure and temperature of said liquified gas prior to the addition thereof to said first stream;

pressurizing said first stream for injection into said formation;

pressurizing a second stream of gas for injection into said formation; and mixing said first and second streams to form a fracturing fluid prior to injection thereof into said formation at a rate and pressure sufficient to cause the fracturing thereof.

13. The method of claim 12 wherein said first and second streams are pressurized for injection into said formation by means of high pressure pump means, said proppants being introduced into said first stream prior to pressurization thereof by said high pressure pump means.

14. The method of claim 12 wherein said proppants introduced into said first stream are cooled using said liquified gas.

15. The method of claim 14 wherein said proppant is present in said first stream in predetermined concentrations.

16. The method of claim 15 wherein said predetermined concentrations of proppant in said first stream may be varied during fracturing of said underground formation.

17. The method of claim 16 wherein the ratio of said gas to said liquified gas by volume is substantially 2:1.

18. The method of claim 12 wherein said liquified gas is liquid carbon dioxide.

19. The method of claim 18 wherein said gas comprises one or more gases selected from the group consisting of nitrogen, air, exhaust gas, natural gas and inert gases.

20. The method of claim 19 wherein said fluid is injected into said well bore at a temperature below the critical temperature of said liquified gas.

21. The method of claim 20 wherein said concentration of said proppant in said first stream varies in the range from an amount in excess of 0 kg/m$^3$ to 1,550 kg/m$^3$.

22. Apparatus for hydraulically fracturing an underground formation penetrated by a well bore comprising:

high pressure pump means for injecting a first stream of liquified gas down said well bore;

first storage means to store said liquified gas under pressure;

conduit means to provide fluid communication between said pump means and said first storage means;

second storage means to store proppants at a temperature and pressure substantially equal to the storage pressure and temperature of said liquified gas;

blender means to blend said proppants from said second storage means into said first stream prior to injection thereof down said well bore;

second high pressure pump means for injecting a second stream of gas down said well bore;

third storage means to store said gas; and high pressure supply lines to provide fluid communication between said first and second pump means and said well bore, said supply lines from said first and second pump means intersecting one another prior to said well bore for admixing of said first and second streams flowing therein before injection thereof down said well bore.

23. A method of fracturing an underground formation penetrated by a well bore comprising the steps of:

forming a first pressurized stream of liquified gas;

forming a second pressurized stream of gas; and admixing said first and second streams to form a fracturing fluid consisting essentially of said first and second pressurized streams and injecting said fracturing fluid into said formation at a rate and pressure to cause the fracturing thereof.

24. The method of claim 23 including the additional steps of introducing proppants into said first stream for transport of said proppants therein, and pressurizing and cooling said proppants to substantially the temperature and pressure of said liquified gas prior to introducing said proppants into said first stream.

25. The method of claim 24 wherein the ratio of said gas to said liquified gas by volume is substantially 2:1.

26. The method of claim 23 wherein said liquified gas is liquified carbon dioxide.

27. The method of claim 26 wherein said non-liquified gas comprises one or more gases selected from the group consisting of nitrogen, air, exhaust gas, natural gas or inert gases.

28. The method of claim 27 wherein the ratio of said non-liquified gas to said liquified gas by volume is substantially 2:1.

29. A method of hydraulically fracturing an underground formation penetrated by a well bore comprising the steps of:

co-mingling a liquified gas and a non-liquified gas to form a fracturing fluid consisting essentially of said liquified gas and said non-liquified gas; and injecting said fracturing fluid through said well bore into said formation to induce fracturing therein.

30. The method of claim 29 including the additional step of adding proppants to said fracturing fluid.

31. The method of claim 30 wherein said proppants are added to said liquified gas prior to said co-mingling of said liquified gas with said non-liquified gas.

32. The method of claim 31 wherein said proppants are pressurized and cooled to substantially the pressure and temperature of said liquified gas prior to introducing said proppants into said liquified gas.

* * * * *

UNITED STATES PATENT AND TRADEMARK OFFICE
CERTIFICATE OF CORRECTION

PATENT NO. : 5,558,160

DATED : September 24, 1996

INVENTOR(S) : Robin Tudor

It is certified that error appears in the above-identified patent and that said Letters Patent is hereby corrected as shown below:

Column 10, line 42, "n$_2$/CO$_2$" should read --N$_2$/CO$_2$--.

Signed and Sealed this

Twenty-fourth Day of December, 1996

Attest:

BRUCE LEHMAN

Attesting Officer     Commissioner of Patents and Trademarks